US012157531B2

(12) United States Patent
Klaushofer et al.

(10) Patent No.: US 12,157,531 B2
(45) Date of Patent: Dec. 3, 2024

(54) SYSTEM HAVING A MOTORCYCLE AND A TRANSPORTABLE RADIO DEVICE

(71) Applicant: KTM AG, Mattighofen (AT)

(72) Inventors: Markus Klaushofer, Fuschl am See (AT); Thomas Morawetz, Neumarkt am Wallersee (AT)

(73) Assignee: KTM AG, Mattighofen (AT)

( * ) Notice: Subject to any disclaimer, the term of this patent is extended or adjusted under 35 U.S.C. 154(b) by 431 days.

(21) Appl. No.: 17/117,990

(22) Filed: Dec. 10, 2020

(65) Prior Publication Data
US 2021/0179221 A1    Jun. 17, 2021

(30) Foreign Application Priority Data

Dec. 11, 2019 (DE) ...................... 10 2019 134 001.2

(51) Int. Cl.
*B60R 25/20* (2013.01)
*B62H 5/04* (2006.01)
(Continued)

(52) U.S. Cl.
CPC ................ *B62J 45/00* (2020.02); *B62H 5/04* (2013.01); *B62H 5/08* (2013.01); *B62J 35/00* (2013.01)

(58) Field of Classification Search
CPC .. B62J 45/00; B62J 35/00; B62H 5/04; B62H 5/08
See application file for complete search history.

(56) References Cited

U.S. PATENT DOCUMENTS 4,607,772 A * 8/1986 Hancock ................. B62J 7/06
                                                 224/442
7,482,907 B2 * 1/2009 Denison ................. H04Q 1/00
                                                 340/5.1
(Continued)

FOREIGN PATENT DOCUMENTS

DE        4102714 A1   8/1991
DE  10 2016 105398 A1 10/2016
(Continued)

OTHER PUBLICATIONS

European Patent Office, Search Report, Mar. 23, 2021, on EuropeanPatent App. No. 20198024.0 (EPO counterpart to U.S. Appl. No. 17/117,990).

*Primary Examiner* — Gonzalo Laguarda
(74) *Attorney, Agent, or Firm* — Rod D. Baker

(57) ABSTRACT

A system having a motorcycle and a transportable radio device. The motorcycle has a frame with a steering head bearing seat and a drive unit, and a switch unit and a control device. The control device has wireless communication with the radio device for controlling operating modes of the motorcycle, depending on an authentication information transmitted from the radio device to the control device. The control device is configured for wireless transmission to the radio device of a blocking information which shifts the radio device into a sleep mode, in which mode communication of the radio device to the control device ceases. The control device also is configured for wireless transmission of a first and/or second piece of time interval information relating to the length of a first and/or second time interval to the radio device, at the end of which the radio device is shifted into the sleep mode.

26 Claims, 5 Drawing Sheets

(51) Int. Cl.
    *B62H 5/08*     (2006.01)
    *B62J 35/00*     (2006.01)
    *B62J 45/00*     (2020.01)

(56) References Cited

U.S. PATENT DOCUMENTS

| | | | |
|---|---|---|---|
| 10,152,876 B2* | 12/2018 | Joao | B60R 25/042 |
| 10,759,382 B2* | 9/2020 | Huang | B62H 5/06 |
| 2008/0224824 A1* | 9/2008 | Yoshizawa | B60R 25/24 |
| | | | 340/5.61 |
| 2018/0170313 A1* | 6/2018 | Iwashita | G07C 9/00309 |
| 2022/0161884 A1* | 5/2022 | Kramer | B62J 17/10 |
| 2023/0039052 A1* | 2/2023 | Shimizu | B60R 25/24 |

FOREIGN PATENT DOCUMENTS

| | | |
|---|---|---|
| DE | 10 2016 112 593 A1 | 1/2018 |
| DE | 10 2017 201087 A1 | 7/2018 |
| EP | 3115284 A2 | 1/2017 |
| EP | 3318704 A1 | 5/2018 |
| EP | 3470275 A1 | 4/2019 |
| WO | 2019043021 A1 | 3/2019 |

* cited by examiner

SYSTEM HAVING A MOTORCYCLE AND A TRANSPORTABLE RADIO DEVICE

CROSS-REFERENCE TO RELATED APPLICATIONS

This application claims priority to German Patent Application No. DE 10 2019 134001.2 filed 11 Dec. 2019, the contents of which are incorporated herein by reference.

BACKGROUND OF THE INVENTION

Field of the Invention

The present invention relates generally to a system having a motorcycle and a transportable radio device, more particularly to a motorcycle with a radio device, switch unit, and a control device, whereby the control device is set up for wireless communication with the radio device and for controlling operating modes of the motorcycle depending on a piece of authentication information transmitted from the radio device.

Background Art

Motorcycles as can be a street motorcycle or also a motorcycle provided for travelling on rough terrain or also an off-road sport motorcycle or a motorcycle provided for other purposes, are known. The drive unit in a motorcycle can be a combustion engine or also an electric motor or also a different drive unit. The drive unit can be set by the user of the motorcycle from an operating mode in which the drive unit does not supply any drive power, into an operating mode in which the drive unit supplies drive power.

To that end, with a combustion engine, this is shifted from the inoperative position into the operative position, the combustion engine is thus started, for which it is necessary for electrical energy to be supplied to the ignition system of the combustion engine in advance, for which the ignition is usually put into operation. With an electric motor as the drive unit, it is provided for the on-board voltage system to be shifted into the operative position, such that the on-board voltage system or a high voltage system provided on the motorcycle is shifted into an operating mode delivering for providing electrical drive energy to the electric motor.

Until now, it has been provided for this purpose that the user of the motorcycle inserts and, where necessary actuates, an ignition key—a key or similar into an ignition switch provided on the motorcycle—and thus induces the operating mode in which the drive unit is shifted into the operative position.

Keyless, so-called comfort access systems are also already known in which the user can activate the vehicle without inserting and correspondingly rotating a mechanical key into an ignition switch or similar. In such a system, a radio unit or transportable radio device is usually provided, which sends a piece of authentication information to a control device provided on the motorcycle. Only when the piece of authentication information received by the control device has been verified as valid by this control device can the operating mode by induced, in which the drive unit can provide drive energy, i.e., the user of the motorcycle can start the combustion engine, for example.

Such a system has comfort features for the user, since it no longer applies that the user must handle an ignition key, which is advantageous when the user is a motorcyclist because the user usually must remove gloves to handle the ignition key. Handling the often-small ignition key is inconvenient and difficult when wearing such gloves.

Another comfort feature is, for example, that sensor devices provided on the motorcycle can be used to establish that the user has sat down on the motorcycle or has placed their hands on the handlebars, and thus a start process of the combustion engine initiated by the user or inducing the operating mode of the drive unit in which it provides drive energy in the most general sense is identified as valid by the comfort system and approved by the system.

Such a keyless comfort system usually functions with a wireless radio communication between the control device and the transportable radio device which replaces the known ignition key. With such a communication, a piece of information is transmitted from the control device to the transportable radio device, and the radio device sends a piece of receipt information or authentication information to the control device.

Such systems are thus susceptible to relay attacks in which the communication between the control device and the transportable radio device can also be recorded by systems that have not been authorized by the user, such that an unauthorized transportable radio device can then send corresponding unauthorized authentication information to the control device, and thus misuse of the motorcycle and transportable radio device system is possible.

A motorcycle having a keyless comfort access system is known from WO 2019/043021 A1, which can recognize individual actions of the user of the motorcycle via sensors provided on the motorcycle.

A wireless communication system for use between a vehicle and a transportable radio device is known from EP 3470275 A1, which is provided to reduce the danger of relay attacks between the vehicle and the transportable radio device without being detrimental to the comfort of the user.

From the foregoing, an object of the invention disclosed hereinafter is to create a system having a motorcycle and a transportable radio device, with the innovative system increasing the security against unauthorized access to the system and reducing the danger of the communication between the control device and radio device being intercepted; this is done without being detrimental to the comfort of the user of the system.

SUMMARY OF THE INVENTION

The invention provides a system having a motorcycle and a transportable radio device, wherein the motorcycle has a motorcycle frame having a steering head bearing seat and a drive unit, as well as a switch unit and a control device. The control device is adapted for wireless communication with the radio device and for controlling operating modes of the motorcycle, depending on a piece of authentication information transmitted from the radio device to the control device. The control device also is adapted to wirelessly transmit, to the radio device, a piece of blocking information that transfers the radio device into sleep mode; in the sleep mode, a communication of the radio device to the control device ceases. The control device also is configured to wirelessly transmit to the radio device a first and/or second piece of time interval information, relating to the length of a first and/or second time interval, at the end of which the radio device adopts the sleep mode, e.g., is transferred into sleep mode.

The motorcycle system according to the invention thus has a motorcycle frame having a steering head bearing seat, as well as a drive unit and a switch unit and a control device.

The switch unit is provided to trigger actions on the motorcycle by means of an actuation of the switch unit, such as triggering the control device for wirelessly communicating with the transportable radio device, for example, or activating various operating modes of the motorcycle.

The operating modes of the motorcycle can be, for example, switching on the ignition system of the drive unit of the motorcycle, i.e., for example shifting the motorcycle into such an operating state that an electric start device of an internal combustion engine of the motorcycle can be activated, e.g., can be supplied with a start current from the on-board voltage network or that, in the most general sense, the ignition can be enabled. A further operating mode which can be controlled by the control device are: the activation and/or deactivation of a steering lock device of the motorcycle; the activation and/or deactivation of an immobilizer device of the motorcycle; the locking and/or unlocking of a filler cap, which seals or releases a fuel filler opening of a fuel tank of the motorcycle; the activation and/or deactivation of the lock of a fastener of a luggage storage device of the motorcycle; the activation and/or deactivation of a lock of a fastener of a seat arrangement of the motorcycle; or the activation and/or deactivation of a control device for starting up the drive unit of the motorcycle—to mention only some examples on this non-exhaustive list.

Using the switch unit which is provided on the motorcycle and, for this purpose, can be provided on a control device of the motorcycle, for example, in the form of the handlebars, control commands or control sequences can thus be transmitted to the control device of the motorcycle, such that this then triggers, i.e., activates or deactivates, individual operating modes of the motorcycle.

Additional aspects of the present invention are disclosed hereinafter; this summary is a general overview and is not intended to be limiting of the scope of the invention.

BRIEF DESCRIPTION OF THE SEVERAL VIEWS OF THE DRAWING

The invention is explained in more detail below by means of the drawings. These show in.

DETAILED DESCRIPTION OF AN EMBODIMENT

Figure 1:
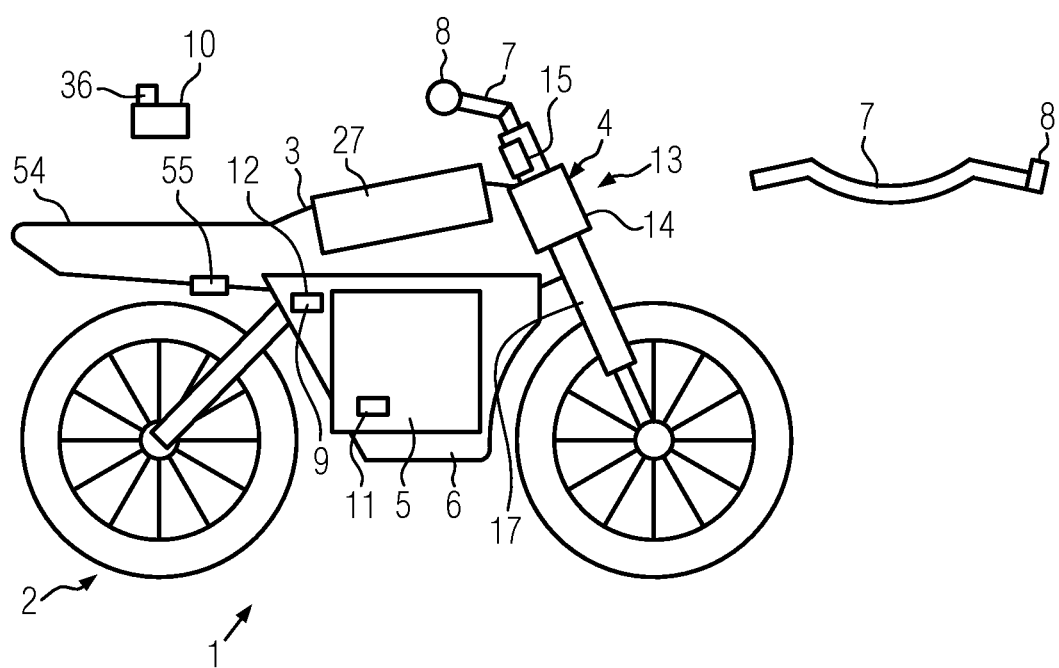
FIG. 1 is a schematic depiction of a system having a motorcycle and a transportable radio device according to an embodiment according to the present invention.

The present invention relates to a system having a motorcycle and a transportable radio device, wherein the motorcycle has a motorcycle frame having a steering head bearing seat and a drive unit as well as a switch unit and a control device, and the control device is set up for wireless communication with the radio device and for controlling operating modes of the motorcycle depending on a piece of authentication information transmitted from the radio device to the control device, and the control device is set up to wirelessly transmit a piece of blocking information that transfers the radio device into sleep mode to the radio device, in which a communication of the radio device to the control device ceases.

The motorcycle can be a street motorcycle or also a motorcycle provided for travelling on rough terrain or also an off-road sport motorcycle or a motorcycle provided for other purposes. The drive unit provided in the motorcycle provided here can be a combustion engine or also an electric motor or also a different drive unit, which can be set by the user of the motorcycle from an operating mode in which the drive unit does not supply any drive power into an operating mode in which the drive unit supplies drive power. To that end, with a combustion engine, this is shifted from the inoperative position into the operative position, the combustion engine is thus started, for which it is necessary for electrical energy to be supplied to the ignition system of the combustion engine in advance, for which the ignition is usually put into operation.

With an electric motor as the drive unit, it is provided for the on-board voltage system to be shifted into the operative position, such that the on-board voltage system or a high voltage system provided on the motorcycle is shifted into an operating mode delivering for providing electrical drive energy to the electric motor.

Until now, it has been provided for this purpose that the user of the motorcycle typically inserts and actuates an ignition key (a key or similar) into an ignition switch provided on the motorcycle, and thus induces the operating mode in which the drive unit is shifted into the operative position.

The presently disclosed system includes a motorcycle and a transportable radio device in which the motorcycle has a motorcycle frame having a steering head bearing seat and a drive unit as well as a switch unit and a control device. The radio key or transportable radio device is carried by the user of the motorcycle, i.e., usually commonly stored away in a jacket pocket or trouser pocket of the motorcycle clothes of the user. The control device is adapted for wireless communication with the radio device, and for controlling operating modes of the motorcycle depending on a piece of authentication information transmitted from the radio device to the control device. The control device also is configured to wirelessly transmit to the radio device a piece of blocking information that transfers the radio device into a "sleep mode" in which communication from the radio device to the control device ceases; the control device additionally wirelessly transmits to the radio device a first and/or second piece of time interval information relating to the length of a first and/or a second time interval, at the end of which the radio device adopts the sleep mode, that is for example transferred into the sleep mode.

The motorcycle provided according to the present system thus has a motorcycle frame having a steering head bearing seat as well as a drive unit and a switch unit and a control device. The switch unit is provided to trigger actions on the motorcycle by means of an actuation of the switch unit, such as triggering the control device for wirelessly communicating with the transportable radio device, for example, or activating various operating modes of the motorcycle.

The operating modes of the motorcycle can be, for example, switching on the ignition system of the drive unit of the motorcycle, i.e., for example shifting the motorcycle into such an operating state that an electric start device of an internal combustion engine of the motorcycle can be activated, and can be supplied with a start current from the on-board voltage network or that, in the most general sense, the ignition can be enabled.

Further operating modes optionally can be controlled by the control device. Such alternative operation modes may include, by way of non-limiting example: the activation and/or deactivation of a steering lock device of the motorcycle; the activation and/or deactivation of an immobilizer device of the motorcycle; the locking and/or unlocking of a filler cap which seals or releases a fuel filler opening of a fuel tank of the motorcycle; the activation and/or deactivation of the lock of a fastener of a luggage storage device of the motorcycle; the activation and/or deactivation of a lock of a fastener of a seat arrangement of the motorcycle; or the activation and/or deactivation of a control device for starting up the drive unit of the motorcycle.

Using a switch unit which is provided on the motorcycle and, for this purpose, can be provided on a control assembly of the motorcycle—for example, in the form of the handlebars—control commands or control sequences can thus be transmitted to the control device of the motorcycle, such that this then triggers, i.e., activates or deactivates, individual operating modes of the motorcycle.

Thus it is also provided, for example, that an actuation of the switch unit leads to the ignition system of the motorcycle being deactivated, the ignition of a drive unit, provided as the combustion engine, of the motorcycle thus being switched off and the combustion engine thus no longer being able to be started. With this deactivation of the ignition system of the drive unit, it is also included that an electric engine or motor, which is provided as the drive unit in the motorcycle, is deactivated, that is, it can no longer supply any drive power, which is why it is separated from the high voltage system, for example, provided on the motorcycle for operating the electric engine.

The deactivation of the ignition system thus takes place when a user of the motorcycle actuates a switch unit, and the control device is also actuated by this actuation of the switch unit to the effect that a piece of time information is transmitted to the transportable radio unit or radio device. A piece of time information is transmitted, the time information relating to a first time interval and/or a second time interval which comprises the length of a first and/or second time interval at the end of which the radio device adopts the sleep mode and thus radio communication from the radio device to the control device no longer takes place; thus authentication information otherwise contained in this radio communication is also no longer transmitted to the control device, and thus advantageously can also no longer be intercepted by means of an unauthorized receiving apparatus that can be used for relay attacks.

The actuation of the switch unit thus leads to the radio device obtaining, via transfer, a piece of constant or changeable time interval information (or one that can be set on the motorcycle), at the end of which the radio device is automatically shifted into sleep mode. This time interval information can be a first piece of time interval information which comprises data information that can be evaluated by the radio device, such that the radio device automatically shifts into sleep mode at the end of the first time interval, i.e., no longer establishes a communication with the control device.

The first time interval can be used to deactivate the automatic deactivation of the transportable radio device at the end of the first time interval, when the user of the motorcycle ascertains within the first time interval that the user has inadvertently triggered the command to deactivate the transportable radio device; this may happen when the user has inadvertently touched the switch unit, for example, which can definitely happen in practice during operation of the motorcycle by a user wearing motorcycling gloves, for example.

Because the reactivation of a transportable radio device that has been deactivated for protecting against relay attacks requires a different actuation from the actuation of the switch unit provided on the motorcycle—namely an activation of the transportable radio device formed as the radio key, for example—the reactivation must be handled separately by the user actuating a switch unit on the transportable radio device. The possibility of revoking the inadvertent triggering of the deactivation of the transportable radio device is advantageous for the user, and increases comfort by, for example, another actuation of the switch unit within the first time interval preventing the automatic deactivation of the transportable radio device.

For this, it is provided that the user of the motorcycle obtains a piece of information, in the form of a piece of visual or acoustic information about the actuation of the switch unit from a display unit or acoustic unit of the motorcycle, after the inadvertent or even intentional actuation of the switch unit, which intentional/unintentional activation would lead to an automatic deactivation of the transportable radio device; the user thus has the option of preventing the deactivation of the transportable radio device via another actuation of the switch unit. Using this visual and/or acoustic information, the user of the motorcycle moreover learns of a confirmation or acknowledgement of the activation of the switch unit of the motorcycle, such that the user can revoke the decision about the intended activation of the sleep mode of the transportable radio device, or override the unintentional activation of the sleep mode, before the transportable radio device actually enters the sleep mode.

In sleep mode, the transportable radio device no longer reacts to requests transmitted wirelessly from the control device to the radio device, such that there is no longer the possibility of also recording the communication between the radio device and the control device in an unauthorized manner.

As has already been mentioned above, the system is additionally or alternatively able to transmit a second piece of time interval information along with the first piece of time interval information. Such second piece of time interval information comprises a piece of information relating to a second time interval, at the end of which the radio device is shifted into sleep mode. When the transportable radio device is to be shifted back into the mode of communication with the control device, it is provided that the user activates the radio key or the transportable radio device by means of pressing a button (or a different form of actuation) of the transportable radio device, such that the radio device answers corresponding requests of the control device to the transponder of the transportable radio device. This second time interval, during which the communication between the transportable radio device and the control device is once again received, can be established in a settable manner according to the invention and serves to increase the security of communication between the transportable radio device and the control device.

When, in particular, the second time interval has elapsed without a corresponding action of the user having been undertaken on the motorcycle, the transportable radio device is shifted automatically back into sleep mode and thus interrupts the communication with the control device. When, according to the system provided, the user of the motorcycle shifts the transportable radio device into the active mode, and this has sent a signal or signals to the control device about the activation, the control device can activate one or more operating modes of the motorcycle. For example, the control device can make the motorcycle ready to start by the ignition signal T15 being enabled. Or, the control device can signal the deactivation of an immobilizer of the motorcycle being deactivated, or a handlebar locking device of the motorcycle being released, or a lock of a filler cap of a fuel tank of the motorcycle being released, or the release of a lock of a top case or side case provided on the motorcycle, or the control device (as the main unit) issuing a release for the engine to start.

Thus, a considerable increase in comfort for the user of the motorcycle is achieved because all, or at least the essential, operating modes of the motorcycle, which are provided for the normal operation of the motorcycle, can be activated by means of the single press of a button or a single actuation on the radio key device by the user, without a further engagement of the driver being required on the motorcycle. According to the system, it is provided that the user of the motorcycle can configure the activation and/or deactivation of individual operating modes of the motorcycle via a display unit, for example, and the user thus has influence over how the motorcycle reacts after a corresponding activation as a result of the actuation of the radio key.

The radio key or the transportable radio device is carried by the user of the motorcycle, i.e., usually commonly stored away in a jacket pocket or trouser pocket of the motorcycle clothes of the user. Because such a radio key device storage location involves the possibility of an unforeseen, unintentional erroneous operation of the device, the user can unintentionally activate the radio device when reaching into the user's jacket pocket that contains the radio key. But, at a distance from the motorcycle at which the user cannot see the motorcycle, the radio device can then send a piece of authentication information to the control device—although the user does not want it to—the radio device is automatically shifted back into sleep mode. In sleep mode, a communication of the radio device with the control device is prevented; at the end of this settable second time interval the control device ensures that the operating modes necessary for the normal operation of the motorcycle are reversed again. For example, the ignition thereafter is switched on, and/or the immobilizer is activated, and/or the steering lock device is activated, and/or the fuel cap lock is activated, and/or the locking device on the top case and one or both side cases is activated, and/or the locking device of the seating arrangement is activated, and/or the release signal for the engine start is reversed by the electronic control unit of the control device. Thus, the present system provides the user of the motorcycle with not only more comfort features than is the case with known systems, but rather it also increases the security of the system against erroneous operations and/or misuse by relay attacks or theft.

It is also provided according to a further aspect of the invention that the control device is adapted for simultaneous or consecutive transmission of the blocking information, and of the first time interval and/or the second time interval information to the radio device. Thus, the system according to the invention with the first and/or second time interval information can also simultaneously transmit the blocking information to the transportable radio device. For example, in the event of an operation of the switch unit by the user of the motorcycle, the system transmits either only the piece of first time interval information and/or the second time interval information to the radio device, or also any combination of the blocking information and/or first time interval information and/or second time interval information, indeed simultaneously or successively or, for example, also two of the three pieces of information simultaneously and the third piece of information then as a result of the first transmission.

According to the present system it is also provided that the first time interval information and/or the second time interval information is transmitted together with the blocking information, or before the blocking information, or after the blocking information, when changes to the first time interval information and/or second time interval information have been undertaken by the user of the system, for example the first time interval and/or second time interval has been amended by the user of the system.

According to a further aspect of the system, the motorcycle is configured to trigger the control device as a result of an actuation of the switch unit for wirelessly transmitting the blocking information and/or the time interval information. Thus, the user of the system can activate the sleep mode of the transportable radio device by actuating the switch unit, yet without a complex activation of the sleep mode (via a button input on a central operating display of the motorcycle) being necessary. As a result of such an actuation of the switch unit, the user of the motorcycle also can actuate operating modes of the motorcycle which are normally manually undertaken when parking the motorcycle during a driving pause or after ending the driving route. Such operating modes may include the locking of the handlebar block, the locking of the filler cap, the locking of the baggage transportation devices on the motorcycle (for example, a top case or a side case), or other operating modes. The user thus experiences optical feedback or also acoustic feedback via a display unit on the motorcycle after an activation of the switch unit and knows that the transportable radio device automatically switches into the sleep mode at the end of the first time interval, and the control device on the motorcycle triggers the operating modes of the motorcycle adjustably selected by the user.

It is provided for further increasing the comfort of the user of the system according to the invention that the control device is adapted to changeably set the first time interval information and/or the second time interval information, such that the user can change the first and/or second time interval via a simple operation (e.g., executed on the display unit of the motorcycle), for example routines familiar to the user in the normal operation of the motorcycle when starting up the motorcycle or when parking the motorcycle after using it.

According to a further aspect of the system, the control device is configured to wirelessly receive a piece of receipt acknowledgement information transmitted from the radio device to the control device after receiving the blocking information and/or first and/or second time interval information. This aspect of the system ensures that the control device obtains feedback from the radio device about the intended receipt of the information sent from the control device. It can also be provided according to the system that the user of the system experiences a corresponding confirmation on the display unit of the motorcycle, and it can also be provided according to the system that the user also obtains an error message on the display unit when this receipt acknowledgement information has not been properly received by the control device. For this purpose, it is also provided that such an error message is only obtained after a further transmission of the blocking information and/or the first time interval information and/or second time interval information to the transportable radio device, which has been carried out by the control device without intended receipt of the receipt acknowledgement information.

After obtaining the receipt acknowledgement information by means of the control device, this can trigger the operating modes mentioned above on the motorcycle, such that the handlebar block, for example, is locked, and thus the motorcycle is well protected against theft (as simply pushing away the motorcycle secured in this way is no longer possible). This serves to further increase the security of the system, because the user hereby obtains a piece of information from the system which informs the user that the radio transmission from the control device to the transportable radio device has been specifically disrupted, for example by means of a disruption signal; thus, the user is made aware that he or she must manually carry out the process of moving the motorcycle into the inoperative position (for example by locking the handlebar block).

According to a further aspect of the system, the radio device is adapted or configured to leave sleep mode, and to wirelessly transmit the authentication information as a result of an actuation of the radio device, triggering the activation of the radio device by the user of the radio device. Accordingly, the user can switch the radio device from sleep mode into active mode by carrying out a simple actuation of a button or similar on the radio device. This ensures that the communication from the radio device to the control device has once again been initiated, and thus the control device provided on the motorcycle can shift the motorcycle into the "active" operating mode—e.g., can unlock the handlebar block device, can deactivate the immobilizer, can release the filler cap lock, can lift the locking of the baggage transport devices on the motorcycle, and can grant release for the engine start.

According to a further aspect of the system, the control device is configured or adapted for wirelessly transmitting a piece of operating mode information to the control device, upon receipt of which the radio device remains in a communication mode, thereby maintaining communication with the control device. This aspect offers the advantage, for example, that the radio device can be switched into a communication mode with the control device, which contains different data information from the authentication information mentioned above, which makes it more difficult for unauthorized third parties to learn the authentication information during a normal operation of the system.

According to a further aspect of the system, the control device is adapted or configured to wirelessly transmit a piece of operating mode information to the radio device within the second time interval, upon receipt of which the radio device remains in a communication mode maintaining communication with the control device. This aspect of the system offers the advantage that the operating mode information is transmitted to the radio device only within a time interval that is temporally very limited, namely within the second time interval, so that a continuous transfer of the operating mode information to the radio device ceases; thus, a data and information exchange between the control device and the transportable radio device that enables misuse is limited.

According to a further aspect of the system, the motorcycle has an immobilizer device which shifts the drive unit of the motorcycle into an operating state, in which state continued movement of the motorcycle is prevented by drive energy provided by the drive unit. The activation or deactivation of the immobilizer device of the motorcycle are operating modes which the control device can carry out, inter alia depending on the communication with the transportable radio device. The user of the system can actuate the switch unit on the motorcycle, such that the blocking information and/or the time interval information is transmitted to the transportable radio device.

At the end of the first time interval (during which the user of the system can revoke the activation of the sleep mode of the radio device), the control device can automatically activate the immobilizer device of the motorcycle, so that the anti-theft function provided by the immobilizer device is automatically activated. Alternatively, it is also provided that the actuation of the switch unit by the user already activates the immobilizer device, and a possible repeated actuation of the switch unit by the user within the first time interval deactivates the immobilizer device again. When the user then reactivates the transportable radio device, and has transmitted a piece of authentication information to the control device, the control device can deactivate the immobilizer device, such that the motorcycle is ready for operation (respecting the immobiliser device).

According to a further aspect of the system, the motorcycle has a handlebar block device, which is provided with a remote-control, in particular an electrically actuated lockable and unlockable bolt, which can be brought into a releasable engagement position with a recess of the steering head bearing seat; the control device is configured to monitor the engagement position. The activation or deactivation of the handlebar block device of the motorcycle are operating modes, which the control device can carry out inter alia depending on the communication with the transportable radio device. The user of the system according to the invention can actuate the switch unit on the motorcycle, such that the blocking information and/or the time interval information is transmitted to the transportable radio device. At the end of the first time interval, during which the user of the system can revoke the activation of the sleep mode of the radio device, the control device can automatically activate the handlebar block device of the motorcycle, such that the anti-theft device provided by the handlebar block device is automatically activated. Alternatively, it is also provided that the actuation of the switch unit by the user already activates the handlebar block device, and a possible repeated actuation of the switch unit by the user within the first time interval deactivates the handlebar block device again. When the user then reactivates the transportable radio device and has transmitted a piece of authentication information to the control device, the control device can deactivate the handlebar block device, such that the motorcycle is ready for operation.

According to a further aspect of the system, the motorcycle has a fuel tank having a fuel filling opening, and a fuel cap arrangement releasably sealing the fuel filling opening, and the fuel cap arrangement is provided with a remote-control, in particular an electrically actuated lockable and unlockable bolt, which can be brought into a releasable engagement position with a recess of the fuel tank; the control device is configured or adapted to monitor this engagement position. The activation or deactivation of the fuel cap arrangement of the motorcycle are operating modes, which the control device can carry out inter alia depending on the communication with the transportable radio device. The user of the system according to the invention can actuate the switch unit on the motorcycle, such that the blocking information and/or the time interval information is transmitted to the transportable radio device. At the end of the first time interval, during which the user of the system can revoke the activation of the sleep mode of the radio device, the control device can automatically activate the fuel cap arrangement of the motorcycle, such that the anti-theft device provided by the locked fuel cap arrangement is automatically activated. Alternatively, it is also provided that the actuation of the switch unit by the user activates the locking of the fuel cap arrangement, and a possible repeated actuation of the switch unit by the user within the first time interval deactivates the locking of the fuel cap arrangement again. When the user then reactivates the transportable radio device and has transmitted a piece of authentication information to the control device, the control device can deactivate the locking of the fuel cap arrangement, such that the motorcycle is ready for operation in terms of the fuel cap accessibility.

According to a further aspect of the system, the motorcycle has a luggage storage device, which is provided with a releasable locking device formed lockably, which is provided with a remote-control, in particular an electrically actuated lockable and unlockable bolt, which can be brought into a releasable engagement position with a recess of the locking device; the control device is adapted to monitor the engagement position. The activation or deactivation of the locking of the luggage storage device of the motorcycle are operating modes which the control device can carry out inter alia depending on the communication with the transportable radio device. At the end of the first time interval, during which the user of the system can revoke the activation of the sleep mode of the radio device, the control device can automatically activate the locking of the luggage storage device of the motorcycle, such that the anti-theft function provided by the locked luggage storage device is automatically activated. Alternatively, it is also provided that the actuation of the switch unit by the user already activates the locking of the luggage storage device, and a possible repeated actuation of the switch unit by the user within the first time interval again deactivates the locking of the luggage storage device. When the user then reactivates the transportable radio device and has transmitted a piece of authentication information to the control device, the control device can deactivate the locking of the luggage storage device, such that the motorcycle is ready for operation (in terms of the luggage storage device).

According to a further aspect of the system, the motorcycle is provided with a seat arrangement, which is provided with a remote-control, in particular an electrically actuated lockable and unlockable bolt, which can be brought into a releasable engagement position with a recess arranged on the motorcycle frame; the control device is configured to monitor the engagement position. The activation or deactivation of the locking of the seat arrangement of the motorcycle are operating modes which the control device can carry out, inter alia depending on the communication with the transportable radio device. The user of the system can actuate the switch unit on the motorcycle, such that the blocking information and/or the time interval information is transmitted to the transportable radio device. At the end of the first time interval, during which the user of the system can revoke the activation of the sleep mode of the radio device, the control device can automatically activate the locking of the seat arrangement of the motorcycle, so that the anti-theft function provided by the locked seat arrangement is automatically activated. Alternatively, it is also provided that the actuation of the switch unit by the user already activates the locking of the seat arrangement, and a possible repeated actuation of the switch unit by the user within the first time interval deactivates the locking of the seat arrangement again. When the user then reactivates the transportable radio device and has transmitted a piece of authentication information to the control device, the control device can deactivate the locking of the seat arrangement, so that the motorcycle is ready for operation (respecting the seat arrangement).

According to a further aspect of the system, the motorcycle is provided with a control device for activating the drive unit of the motorcycle. This control device can be, for example, an electromotively operated starter for starting a drive unit (i.e., a combustion engine of the motorcycle). Additionally, this control device can also be a device which permits or prevents the supply of electrical energy to an electric engine as the drive unit of the motorcycle, from the on-board voltage network or a high voltage network of the motorcycle. The activation or deactivation of the activation possibility of the drive unit of the motorcycle are operating modes which the control device can carry out, inter alia depending on the communication with the transportable radio device. At the end of the first time interval, during which the user of the system can revoke the activation of the sleep mode of the radio device, the control device can automatically deactivate the activation possibility of the drive unit of the motorcycle, so that the anti-theft function provided by the deactivated drive unit is automatically activated. Alternatively, it is also provided that the actuation of the switch unit by the user already automatically deactivates the possibility of activating the drive unit of the motorcycle, and a possible repeated actuation of the switch unit by the user within the first time interval reactivates the activation possibility of the drive unit of the motorcycle. When the user then reactivates the transportable radio device and has transmitted a piece of authentication information to the control device, the control device can activate the activation possibility of the drive unit of the motorcycle, such that the motorcycle is ready for operation.

Finally, it is provided according to a further aspect of the system that the "operating modes" include at least one state of the motorcycle, selected from the following group of states: (1) the drive unit of the motorcycle is shifted into drive preparation or out of drive preparation; (2) an immobilizer device of the motorcycle is activated or deactivated; (3) a handlebar block device of the motorcycle is activated or deactivated; (4) a lock of a fuel cap releasably sealing a fuel filling opening of the fuel tank of the motorcycle is activated or deactivated; (5) a lock of a seal of a luggage storage device of the motorcycle is activated or deactivated; (6) a lock of a seal of a seat arrangement of the motorcycle is activated or deactivated; and (7) a control device for activating the drive unit of the motorcycle is activated or deactivated.

Attention is invited to FIG. 1, showing a system 1 according to the present invention, having a schematically depicted motorcycle 2 and a transportable radio device 10. The motorcycle 2 has a motorcycle frame 3 having a steering head bearing seat 4 and a drive unit 5, which, in the depicted embodiment of the system 1, is a combustion engine 6. Moreover, the motorcycle 2 has handlebars 7 having a switch unit 8 arranged thereon, which, in the depicted embodiment of the motorcycle 2, is arranged on the right end of the handlebars 7. The motorcycle 2 further has a schematically depicted control device 9, which is adapted for wirelessly communicating with the transportable radio device 10, and furthermore can control operating modes of the motorcycle 2, as will be explained below in yet more detail.

The radio device 10 is configured to wirelessly communicate with the control device 9. The radio device 10 can be shifted, via a piece of blocking information transmitted from the control device 9 to the radio device 10, into a sleep mode. When it is in sleep mode, the radio device 10 no longer obtains a wireless communication connection to the control device 9 and, in particular, no longer transmits any authentication information to the control device 9; accordingly, this authentication information can also no longer be received via an unauthorised receiver and thus also reduces the danger of relay attacks.

The system 1 also comprises an only schematically depicted immobilizer device 11, which can grant a release to an engine control device 12, which in turn can be part of the control device 9. Without the engine control device 12, the combustion engine 6 cannot be started, or without which an electric engine as the drive unit 5 cannot provide any drive energy. This release for the engine control device 12 can be transmitted via a vehicle bus system provided on the motorcycle 2 in the form of a controller area network CAN bus, for example, wherein the release for the engine control device 12 then no longer takes place when prevented by the immobilizer device 11.

The immobilizer device 11 can also be integrated with the control device 9 and coded by the transportable radio device 10, i.e., can use encrypted transmitted authentication information for evaluating the amendment of the user and transmit a release to the engine control device 12 in the form of a piece of coded, i.e., cryptographically secured, release communication information to the engine control device 12.

Figure 2:
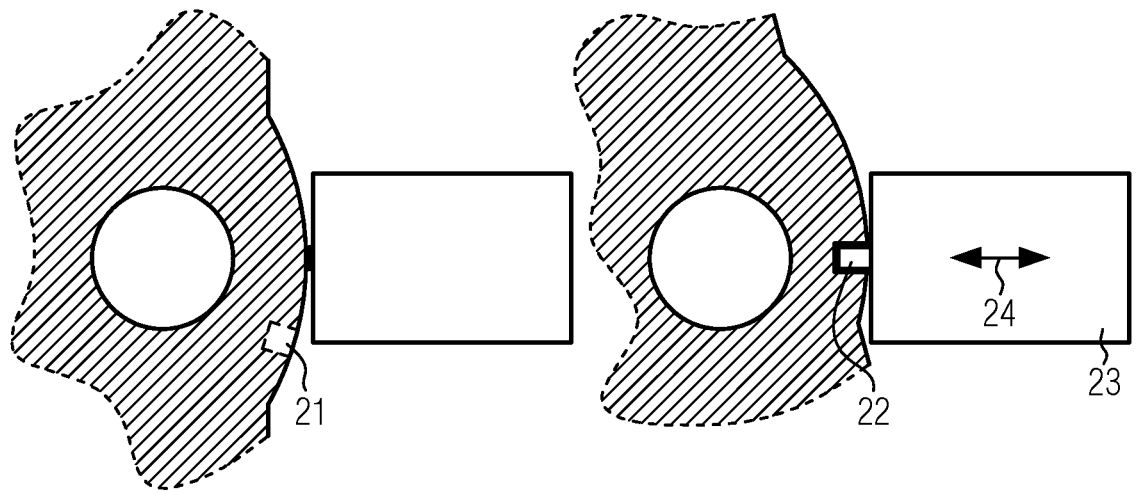
FIG. 2 is a top view from above of a schematic depiction of a handlebar block device on the motorcycle.
Figure 2:
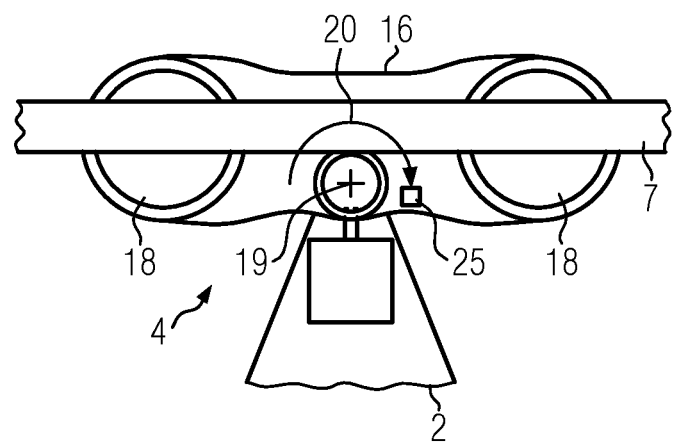

The motorcycle frame 3 is provided with the steering head bearing seat 4 in the form of a steering head bearing pipe 14 equipped with a steering head bearing 13, which is made more obvious by reference to FIG. 2. The frame 3 is provided also with a handlebar block device 15 depicted only schematically in FIG. 1. This handlebar block device 15 is in the form of a mechanical lock, which will be explained in yet more detail below with reference to FIG. 2.

FIG. 2 shows, in the lower drawing, a schematic depiction of the handlebars 7 and an upper fork crown 16, which serves to receive the telescopic suspension fork 17 depicted only schematically in FIG. 1 with the two telescopic suspension fork legs 18. The telescopic suspension fork 17 can be pivoted around a pivot point 19 formed by the steering head bearing 14, as indicated by the arrow 20 in FIG. 2.

The steering head bearing seat 4 is arranged adjacently to the motorcycle frame 3 and comprises the fork crown 16 which, as can been seen by means of the upper depiction of FIG. 2, has a recess 21 into which a bolt 22 can engage. The bolt 22 can be shifted in the direction of the double arrow 24 by means of an electrically actuatable actuation device 23 in order to lock the handlebar block device 15, as seen on the right-hand side of the upper depiction of FIG. 2, or to lift the locking position of the handlebar block device 15, as seen from the left-hand side of the upper depiction of FIG. 2. The control device 9 can monitor the actuation of the actuation device 23 and thus monitor the engagement of the bolt, i.e., whether the handlebar block device 15 is in the locked or in the unlocked position. The control device 9 can also trigger the actuation device 23 for moving the bolt 22 in the direction of the double arrow 24, that is, induce the locking position of the handlebar block device 15 and also lift or release the locking position. In this way, the control device 9 can control this operating mode of the motorcycle 2.

It is also provided that the pivoting movement of the fork crown 16, according to the arrow 20, is recorded by a sensor in the form of a rotation angle sensor 25; accordingly, the activation of the actuation device 23 for shifting the bolt 22 to induce an engagement position of the bolt 22 with the recess 21 takes place only when a superposition of the bolt 22 with the recess 21 has been established by the rotation angle sensor 25 of the control device 9.

The control device 9 is thus set up and configured to activate the handlebar block device 15 when the user of the system 1 has actuated the switch unit 8, and thus has communicated to the system 1 that it is to shift into a sleep mode. Sleep mode may be, for example for a driving pause or at the end of the journey with the motorcycle 2, at which time anti-theft measures are to be adopted. Anti-theft measures include, along with activating the immobilizer device 11, the activation of the handlebar block device 15, i.e., inducing the locking engagement of the bolt 22 into the recess 21. For this purpose, with the present system, it is also provided that the user obtains a piece of information in the form of a text message, for example, on a display unit 26, to induce the superposition position of the bolt 22 with the recess 21; this may be done by the user being able to increase the steering angle of the handlebars 7 in the direction to the left up to a stop position, for example. A further text message of the system 1 to the user can also follow on from this text message, said further message confirming the successful induction of the superposition position.

Figure 3:
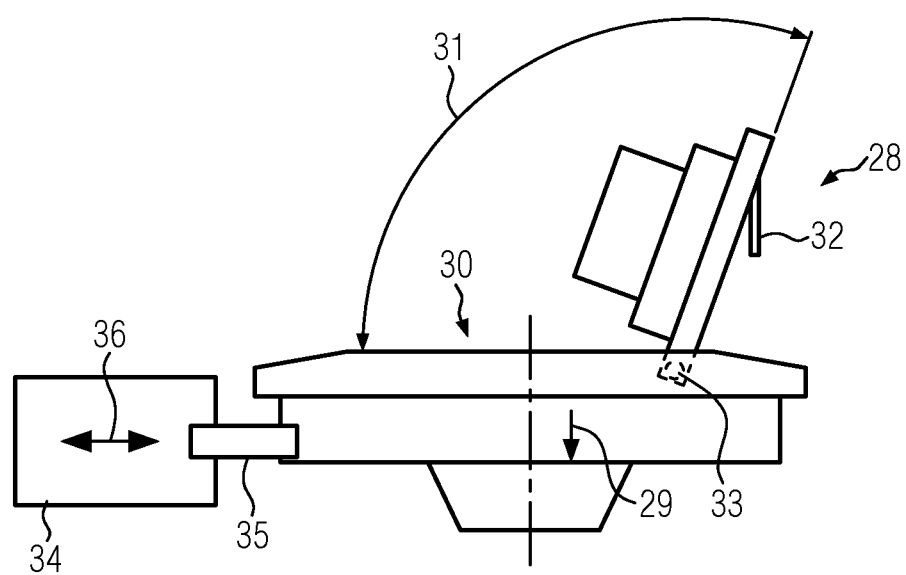
FIG. 3 is a schematic depiction of a fuel cap lock on the motorcycle.

Moreover, as also evident from FIG. 1, in the depicted embodiment having a combustion engine 6 as the drive unit 5, the motorcycle 2 also has a fuel tank 27 which can be sealed by means of a fuel cap 28 (FIG. 3). FIG. 3 shows the open position of the fuel cap 28, such that the fuel tank 27 can be filled with fuel in the direction of the arrow 29. For this purpose, the user of the motorcycle 2 can release the fuel filling opening 30 by means of a pivot movement of the fuel cap 28 in the direction of the arrow 31 according to FIG. 3; the user actuates a flap 32 of the fuel cap 28 and pivoting the fuel cap 28 on the hinge 33 to induce the open position.

When the motorcycle 2 is in an inoperative position and anti-theft measures or anti-tamper measures have been adopted on the motorcycle 2, the fuel cap 28 is secured via a schematically depicted electric actuation device 34 by the actuation device 34 actuating an only schematically depicted fuel access bolt 35 to induce a locking position of the bolt 35 with the fuel cap 28, such that the fuel cap 28 cannot be opened. For this purpose, after the actuation of the switch unit 8 by the user, the control device 9 can actuate the actuation device 34 to the fuel access bolt 35 to induce the locking position of the bolt 35 with the fuel tank 27.

If the user would like to restart his or her journey with the motorcycle 2, then the user actuates a button 36 on the transportable radio device 10, which leads to the radio device 10 wirelessly sending a piece of corresponding authentication information to the control device 9; consequently, the control device 9 triggers the actuation device 34, such that the fuel access bolt 35 is moved into an unlocked position from the locking position with the fuel cap 28. The fuel cap 28 thus can be reopened via the flap 32. The actuation device 34 can move the bolt 35 in the direction of the double arrow 36 in both directions.

The control device 9 is set up and adapted to control the operating mode of the fuel cap 28, i.e., to change the operating mode of the fuel cap 28 to the effect that it can be opened via the flap 32, or cannot be opened. When the user has actuated the switch unit 8 to induce the sleep mode of the system 1 or the motorcycle 2, the control device 9 can trigger the actuation device 34 to induce the locking position of the fuel access bolt 35 with the fuel cap 28. When the user of the system 1 or motorcycle 2 has actuated the button 36 on the transportable radio device 10 to resume the journey with the motorcycle 2, and the radio device 10 has sent a piece of authentication information then recognised as valid by the control device 9, the control device 9 can trigger the actuation device 34 to lift the locking position of the fuel access bolt 35 with the fuel cap 28. The control device 9 is thus set up to control and monitor the operating mode of the system 1 in terms of locking the fuel filling opening 30 of the fuel tank 27.

Figure 4:
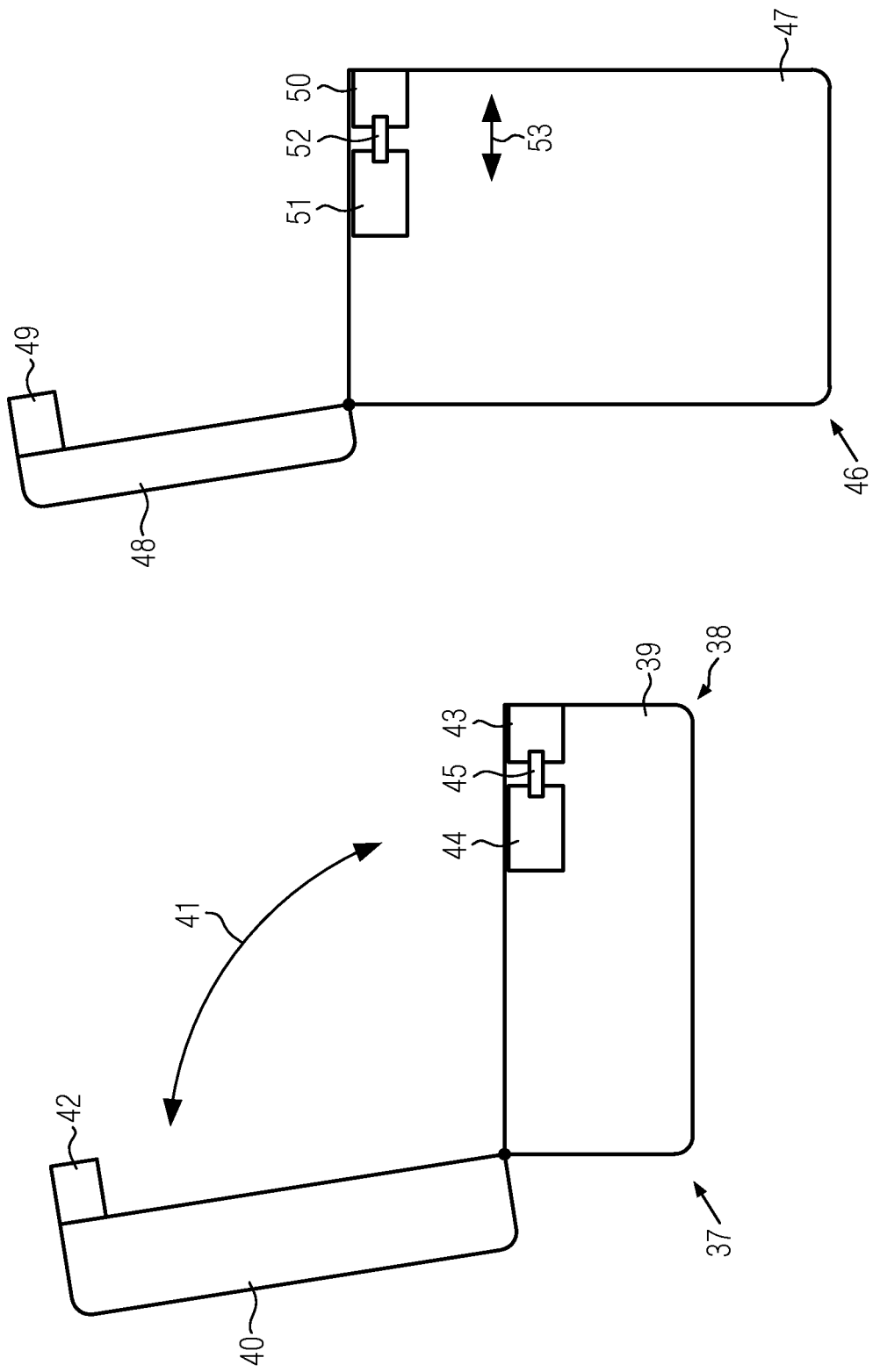
FIG. 4 is a schematic depiction of a top case and a side case having a respective locking device.

FIG. 4 shows a schematic depiction of a luggage storage device 37 for the motorcycle 2. Storage device 37 may be in the form of a top case 38 depicted on the left-hand side of the drawings according to FIG. 4. The top case 38 has a lower shell 39 and an upper shell 40 which can be pivoted relative to the lower shell 39 in the direction of the double arrow 41 in order to open or close the top case 38. In the closed position of the top case 38, the upper shell 40 abuts on the lower shell 39. In the closed position, a lug 42 of the upper shell 40 is engageable with a recess 43 of the lower shell, and a storage device bolt 45 can be shifted by the storage device actuation device 44 to induce an engagement position between the bolt 45 and the lug 42; this is accomplished via the schematically depicted electric actuation device 44. The top case 38 thus can be latched against unauthorized manipulation.

The control device 9 is set up and configured to trigger the electric actuation device 44 to induce a locking position between the storage device bolt 45 and the lug 42 after a corresponding actuation of the switch unit 8 by the user. The control device 9 is also adapted to lift (release) the locking position again between the bolt 45 and the lug 42 when a user of the system 1 has actuated the button 36 on the transportable radio device 10, and has thus transmitted to the control device 9 a piece of authentication information assessed as valid by the control device 9, and which consequently triggers the storage device actuation device 44 to release the locking position between the bolt 45 and the lug 42. The control device 9 is thus set up to monitor and control the operating mode of the locking of the seal of the luggage storage device 37.

Previously, the luggage storage device 37 has been explained by means of a top case 38. The motorcycle 2 according to the system 1 according to the invention may also have a side case 46, also depicted on the right-hand side of the view in FIG. 4, instead of or in addition to the top case 38 as the luggage storage device. The side case 46 here has a lower shell 47 and an upper shell 48 pivotably hinged thereon, which simultaneously forms the lid of the side case 46. The side case cover 48 has a side case lug 49 which, in a closed position of the side case 46, comes to rest in a recess 50 of the side case 46. Similarly, as has already been illustrated above with regard for the top case 38, the side case 46 also preferably has an electric, actuatable side case actuation device 51. By means of the actuation device 51, a side case bolt 52 can be shifted in the direction of the double arrow 53, and in such a way that the bolt 52 with the side case lug 49 assumes a locking position or can be rereleased from the locking position. To induce the locking position, the control device 9 can trigger the side case actuation device 51 in such a way that it shifts the side case bolt 52 into the locking position with the lug 49 of the side case cover 48. When the locking position between the lug 49 and the bolt 52 is to be reversed and released, the control device 9 can shift the bolt 52 by correspondingly triggering the actuation device 51 out of engagement with the lug 49.

When the user of the system 1 would like to shift the motorcycle 2 into a parked position or inoperative position, the user can actuate the switch unit 8 to so do, whereby the blocking information is simultaneously transmitted to the transportable radio device 10, and the latter is shifted or switched into the sleep mode at the end of the first time interval. The actuation of the switch unit 8 also leads to the control device 9 triggering the actuation device 51 for shifting the bolt 52 into the locking position of the bolt 52 with the lug 49. Similarly, the actuation of the switch unit 8 also leads to the control device 9 activating the immobilizer device 11, activating the handlebar block device 15, and activating the lock of the fuel cap 28 by the bolt 35 being shifted into the locking position with the fuel cap.

The actuation of the switch unit 8 also leads to a corresponding notification in the form of a text message to the user being emitted on the display unit 26. The text message informs the user that the user has activated the sleep mode of the transportable radio device 10 and, moreover, has activated the anti-theft mechanisms or mechanisms for securing the motorcycle 2 or the system 1 from tampering or theft. This security is provided by the immobilizer device being activated, and/or the handlebar block device being activated, and/or the fuel cap being locked, and/or the top case and/or the side case or further luggage storage devices being locked, and/or the seat arrangement of the motorcycle being locked.

Figure 5:
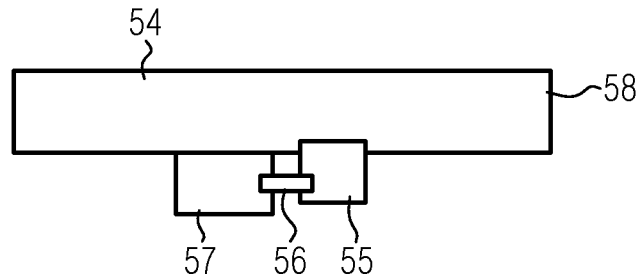
FIG. 5 is a schematic depiction of a seat arrangement having a lock.

The motorcycle 2 also has a seat arrangement 54 which is schematically depicted in FIGS. 1 and 5. Along with the seat arrangement 54, the motorcycle 2 also has an electrically actuatable actuation device 55 which is provided with a shiftable bolts 56. The shiftable bolt 56 is releasably engageable with the frame component 57 of the motorcycle frame 3, as schematically depicted in FIG. 5. When the user actuates the switch unit 8, this, along with the previously described mechanisms against tampering on the motorcycle 2 or against a theft of the motorcycle 2, leads to the control device 9 triggering the actuation device 55 in such a way that it shifts the bolt 56 into a locking position with the frame component 57 of the motorcycle frame 3. The seat 58 of the seat arrangement 54 can then no longer be opened, and access to components or devices of the motorcycle 2 arranged under the seat 58, such as a fuse box, a boot or similar, for example, is thus denied to unauthorized third parties.

When the user of the system 1 or the motorcycle 2 would like to shift the vehicle into an active position, they actuate the button 36 of the transportable radio device 10. The transportable radio device 10 then sends a piece of authentication information, confirmed as valid, and the control device 9 can shift the actuation device 55 for shifting the bolt 56 from the engagement position with the frame component 57 into an unlocked position. The user once again then has access to devices of the motorcycle 2 arranged under the seat 58. The control device 9 is thus configured to monitor and control the operating mode of the system 1 or the motorcycle 2 in relation to the locking position of the lock of the seat arrangement 54.

When the user of the system 1 has actuated the switch unit 8 for activating the sleep mode of the transportable radio device 10, this also leads to the control device 9 no longer permitting a start release for activating the drive unit 5—and thus the drive unit no longer being able to be activated. When the user has, however, deactivated the drive unit, i.e., has turned off the combustion engine, for example, but has not actuated the switch unit 8 for activating the sleep mode of the transportable radio device 10, the user can still start and activate the combustion engine according to an embodiment of the system; this is advantageous, for example, with a longer stop at traffic lights preventing the further journey of the vehicle.

Figure 6:
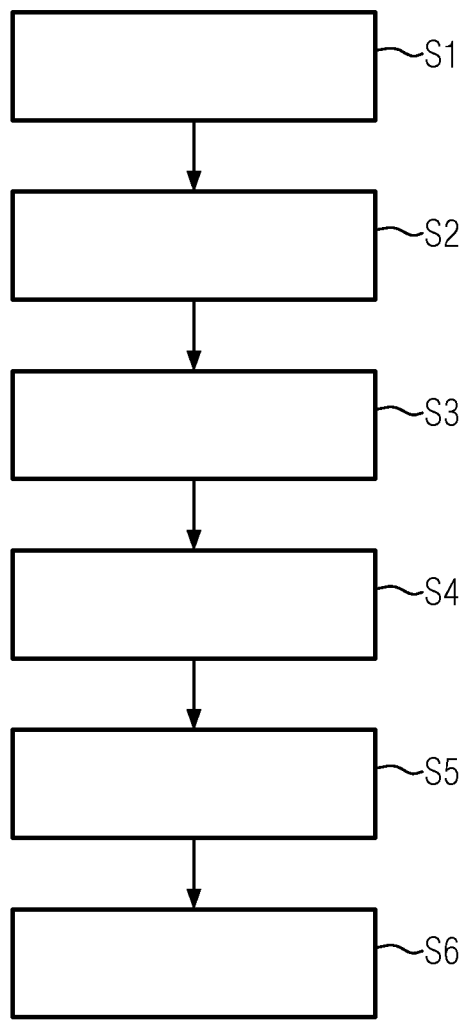
FIG. 6 a flowchart relating to the functionality of the system.

FIG. 6 provides a flowchart for further explaining the system according to the present invention. In a step S1, according to the invention, the system 1 monitors an activation of the request to shift the transportable radio device 10 into the sleep mode. To do so, the system 1 monitors an actuation of the switch unit 8 by the user of the motorcycle 2. With the actuation of the switch unit 8, the time interval T1 starts, until the end of which the user can revoke any accidental actuation of the switch unit 8, and thus an activation of the sleep mode of the transportable radio device 10, by further actuating the switch unit 8.

According to the present system, it is also provided that this first time interval T1 can be changed by the user of the system, for example via a corresponding change of the time interval by means of an operation of the display unit 26 on the motorcycle 2. The time interval T1 can be transmitted from the control device 9 to the transportable radio device 10. This can be carried out, for example, by a corresponding actuation of the switch unit 8 by the user of the motorcycle.

The system 1 thus enables the user to transmit the first time interval to the transportable radio device 10 via a corresponding actuation of the control device 9; together with the transmission of the first time interval T1 to the transportable radio device 10—or also before or after the transmission of the first time interval T1 to the radio device 10—a piece of blocking information can be transmitted to the radio device 10, wherein the transmission of this blocking information leads to the transportable radio device 10 shifting into the sleep mode. When in the sleep mode, the transportable radio device 10 no longer initiates communication with the control device 9, i.e., in particular it also no longer transmits any authentication information to the control device 9.

When a piece of corresponding blocking information has been transmitted from the control device 9 to the transportable radio device 10 and the first time interval T1 has ended, the transportable radio device 10 automatically shifts into the sleep mode. In this sleep mode, the transportable radio device 10 also no longer reacts to corresponding communication requests by the control device 9. In this sleep mode, moreover, the transportable radio device 10 also no longer sends any authentication information to the control device 9, such that this can also no longer be received by an unauthorized third party.

With the present system it is also provided that, after receiving the blocking information from the control device 9, the transportable radio device 10 can send a piece of receipt acknowledgement information to the control device. The acknowledgement information can also be displayed as confirmation of the activation of the sleep mode, for example, for the user of the system as receipt acknowledgment in the display unit 26 of the motorcycle 2.

In a next step S2, the control device 9 can deactivate the ignition release signal T15 of the motorcycle 2 and activate the immobilizer device 11. The control device 9 can also activate the handlebar block device 15 of the motorcycle 2, as has already been explained above. To do so, the system 1 can also, for example, emit an indication via the display unit 26 of the motorcycle 2 to the user of the vehicle to increase the steering angle of the handlebars 7 in such a way that a superposition position between the bolt 22 of the handlebar block device 15 is obtained, and the recess 21 of the fork crown 16 is induced; this can monitor the system 1, for example via the rotation angle sensor 25, so that—after establishing that the superposition position has been induced and the ignition system for the vehicle has been deactivated—the system 1 automatically induces the locking position of the bolt 22 with the recess 21, which can also be communicated, for example, via a corresponding message to the user of the vehicle via the display unit 26.

In a next step S3, the control device 9 can induce the locking position of the fuel cap 28 by the actuation device 34 being triggered to shift the fuel access bolt 35 into the locking position of the bolt 35 with the fuel cap 28.

The system 1 can also secure the luggage storage system of the motorcycle 2 in a next step S4. In step S4, the control device 9 triggers the storage device actuation device 44 and/or side case actuation device 51 for shifting the storage device bolt 45 and/or side case bolt 52 in such a way that the respective bolt 45 and/or 52 with the respective lug 42 and/or 49 assumes a locking position, and thus an unauthorized access to the top case 38 and/or the side case 46 is no longer possible. In this step S4, the control device 9 can also cause a locking of the seat arrangement 54, as has already been explained above.

Finally, the present system can also prevent the transmission of a release signal to the engine control device 12 in a step S5, wherein this can also already be carried out according to an alternative process together with step S1. It has been mentioned above that, in step S1, the system 1 can transmit the first time interval T1, which, according to the present invention, may comprise a time duration of about one second inclusive to about 10 seconds inclusive, to the transportable radio device 10; in step S1, a piece of time interval information can also be transmitted to the transport radio device 10 in relation to the second time interval T2. This second time interval T2, which may comprise a time duration from about five seconds inclusive to about 60 seconds inclusive, for example, can also be transmitted in step S1 from the control device 9 to the transportable radio device 10. The transmission of the second time interval T2 can be carried out before the transmission, or after the transmission, or together with the transmission, of the blocking information to the transportable radio device 10; it is also provided according to the system 1 that the time interval information relating to the first time interval T1 and/or the second time interval T2 is transmitted with each transmission, or with a certain number or selection of transmissions, of the blocking information from the control device 9 to the transportable radio device 10.

When the user of the system 1 desires to transfer the motorcycle 2 back into an activated state to continue the journey with the motorcycle 2, the user actuates the button 36 on the transportable radio device 10. This actuation leads to the transportable radio device 10 again answering corresponding communication requests from the control device 9 to the transportable radio device 10 and, in particular, also transferring a piece of authentication information to the control device 9.

In a step S6, the receipt of the authentication information and its confirmation by the control device 9 as valid authentication information leads to the control device 9 shifting the drive unit 5 of the motorcycle 2 into preparation to drive; this is accomplished by a piece of release information to the engine control device 12 being carried out, such that the user can operate the drive unit 5—for example, the use can thus start the combustion engine 6. After the receipt of the authentication information and its confirmation as valid, the control device 9 can deactivate the immobilizer device 11 of the motorcycle, and deactivate the handlebar block device 15 of the motorcycle, and deactivate the lock of the fuel cap 28, and deactivate the locking of the luggage storage device of the motorcycle (i.e., deactivate the locking of the top case and/or the locking of the side case). Moreover, the control device 9 can also again permit the opening of the seat arrangement of the motorcycle by the locking of the shutter of the seat arrangement being deactivated.

The user can also change the time interval T2, for example, via an actuation of the display device of the motorcycle and adapting to its requirements, for example. For example, when the motorcycle is in the inoperative condition, and with activated anti-theft mechanisms, and is in surroundings in which an unauthorized access by third parties is improbable, the user may prefer and implement a longer period of time T2, than is the case in surroundings in which an unauthorized access to the motorcycle by third parties is more probable.

At the end of the time period T2, the transportable radio device 10 is shifted back into sleep mode in which a communication with the control device 9 no longer takes place, and thus the motorcycle 2 is shifted into the operative position by the control device 9; the immobilizer is reactivated, for example, and/or operating modes of the motorcycle that can be selected by the user can be induced. When the user of the motorcycle 2 activates the motorcycle within the settable time period T2, i.e., starts the combustion engine, the motorcycle is available for the intended operation and the transportable radio device 10 does not assume the sleep mode.

In contrast, when the transportable radio device 10 has unintentionally been activated, after it has previously been deactivated and has assumed the sleep mode—i.e. the button 36 of the radio device 10 has been actuated in an unintentional manner, because the radio device was in a pocket of the motorcycle clothing of the user and the radio device has been activated by a movement of the user in an unintentional manner and this happened within the range of the radio connection to the control device—the second period of time T2 ensures that the wireless communication between the transportable radio device 10 and the control device 9 is again interrupted after the end of the time period T2. Thus there is no possibility for a third party to record a piece of authentication information wirelessly transmitted from the radio device 10 to the control device 9 and after this use it with ill intentions.

According to the present system, by setting the system 1, for example via a display unit of the motorcycle, the user can perform changes to the reaction of the system 1 to the receipt of the authentication information after lifting the sleep mode by the transportable radio device. This ability also works to increase the comfort for the user, since the user can select which operating mode the motorcycle shall assume after receiving the authentication information. The user can thus select whether the receipt of the authentication information, and its confirmation by the control device 9 as valid, leads to the drive unit 5 being shifted into preparation for driving, and/or the immobilizer device being deactivated, and/or the handlebar block device being deactivated, and/or the locking of the fuel cap being deactivated, and/or the locking of the seal of the luggage storage system being deactivated, and/or the locking of the seat arrangement being deactivated. The user can thus adjust the operating modes of the motorcycle completely according to their requirements of what he or she expects from the motorcycle, when the user has activated the radio device 10 and thus has communicated the user's wish to the system to begin or to continue the journey with the motorcycle 2.

In relation to features of the invention not explained above in more detail, reference is explicitly made to the claims and the drawings.

LIST OF REFERENCE NUMERALS

1. System
2. Motorcycle
3. Motorcycle frame
4. Steering head bearing seat
5. Drive unit
6. Combustion engine
7. Handlebars
8. Switch unit
9. Control device
10. Radio device
11. Immobiliser device
12. Engine control device
13. Steering head bearing
14. Steering head pipe
15. Steering head block device
16. Fork crown
17. Telescopic suspension fork
18. Telescopic suspension fork leg
19. Rotation point
20. Arrow
21. Recess
22. Bolt
23. Actuation devices
24. Double arrow
25. Rotation angle sensor
26. Display unit
27. Fuel tank
28. Fuel cap
29. Arrow
30. Fuel filling opening
31. Arrow
32. Flap
33. Hinge
34. Actuation device
35. Bolt
36. Button
37. Luggage storage device
38. Top case
39. Shell
40. Shell
41. Double arrow
42. Lug
43. Recess
44. Actuation device
45. Bolt
46. Side case
47. Shell
48. Shell, lid
49. Lug
50. Recess
51. Actuation device
52. Bolt
53. Double arrow
54. Seat arrangement
55. Actuation device
56. Bolt
57. Frame component
58. Seat

What is claimed is:

1. A system having a motorcycle and a transportable radio device, wherein:
the motorcycle has:
a motorcycle frame having a steering head bearing seat;
a drive unit;
a handlebar;

a keyless switch unit on the handlebar; and
a control device adapted for:
   wireless communication with the radio device and for controlling operating modes of the motorcycle depending on an authentication information transmitted from the radio device to the control device, and for
   wireless transmission to the radio device of a blocking information shifting the radio device into a sleep mode, in which mode a communication of the radio device to the control device ceases; and
wherein the control device is further adapted for wireless transmission of a first time interval information and/or second time interval information relating to the length of a first time interval (T1) and/or second time interval (T2) to the radio device, at the end of which the radio device assumes the sleep mode; and
wherein the motorcycle is adapted to trigger the control device as a result of an actuation of the switch unit on the handlebar for the wireless transmission of the blocking information and/or the first or second time interval information.

2. The system according to claim 1, wherein the control device is configured for the simultaneous or consecutive transmission of the blocking information and the first time interval and/or the second time interval information to the radio device.

3. The system according to claim 1, wherein the control device changeably sets the first time interval information and/or the second time interval information.

4. The system according to claim 1, wherein the control device is configured for the wireless receipt of a receipt acknowledgement information to the control device, transmitted by the radio device after receiving the blocking information or the first time interval information or the second time interval information.

5. The system according to claim 1, wherein the radio device is adapted to leave the sleep mode and to wirelessly transmit the authentication information as a result of an actuation of the radio device by a user of the radio device triggering the activation of the radio device.

6. The system according to claim 1, wherein the control device wirelessly transmits an operating mode information to the radio device, upon receipt of which the radio device remains in a communication mode maintaining communication with the control device.

7. The system according to claim 6, wherein the control device wirelessly transmits the operating mode information to the radio device within the second time interval (T2), upon receipt of which the radio device remains in a communication mode maintaining communication with the control device.

8. The system according to claim 6, wherein the radio device switches into sleep mode after the second time interval (T2) has elapsed when the operating mode information does not emerge within the second time interval (T2), in which sleep mode a communication of the radio device to the control device ceases.

9. The system according to claim 1, wherein the motorcycle has an immobilizer device which shifts the drive unit of the motorcycle into an operating state in which a continued movement of the motorcycle with a drive energy provided by the drive unit is prevented.

10. The system according to claim 1, wherein the motorcycle has a handlebar block device provided with a remote-controllable, electrically actuated, lockable and unlockable bolt, the bolt releasably engageable with a recess of the steering head bearing seat or with a device, and wherein the control device monitors the engagement of the bolt.

11. The system according to claim 1, wherein the motorcycle comprises a fuel tank having a fuel filling opening and having a fuel cap arrangement releasably sealing the fuel filling opening, wherein further the fuel cap arrangement is provided with a remote-controllable, electrically actuated, lockable and unlockable bolt which is releasably engageable with a recess of the fuel tank or with the fuel cap arrangement, and wherein the control device monitors the engagement of the bolt.

12. The system according to claim 1, wherein the motorcycle comprises a luggage storage device having a releasable locking device formed to be lockable, which locking device is provided with a remote-controllable, electrically actuated, lockable and unlockable bolt which is releasably engageable with the locking device, and wherein the control device monitors the engagement of the bolt.

13. The system according to claim 1, wherein the motorcycle comprises a seat arrangement having a remote-controllable, electrically actuated, lockable and unlockable bolt which is releasably engageable with a recess arranged on the motorcycle frame, and wherein the control device monitors the engagement of the bolt.

14. The system according to claim 9, wherein the motorcycle comprises a control device for activating the drive unit of the motorcycle.

15. The system according to claim 1, wherein the operating modes comprise at least one state of the motorcycle selected from the group consisting of the drive unit of the motorcycle is shifted into preparation to drive or out of preparation to drive, an immobilizer device of the motorcycle is activated or deactivated, a handlebar block device of the motorcycle is activated or deactivated, a lock of a fuel cap releasably sealing a fuel filling opening of a fuel tank of the motorcycle is activated or deactivated, a lock of a seal of a luggage storage device of the motorcycle is activated or deactivated, a lock of a seal of a seat arrangement of the motorcycle is activated or deactivated, and a control device for activating the drive unit of the motorcycle is activated or deactivated.

16. A system having a motorcycle and a transportable radio device, wherein:
the motorcycle has:
   a motorcycle frame having a steering head bearing seat;
   a drive unit;
   a handlebar;
   a keyless switch unit on the handlebar; and
   a control device adapted for:
      wireless communication with the radio device and for controlling operating modes of the motorcycle depending on an authentication information transmitted from the radio device to the control device, and for
      wireless transmission to the radio device of a blocking information shifting the radio device into a sleep mode, in which mode a communication of the radio device to the control device ceases;
   wherein the control device is further adapted for wireless transmission of a first time interval information and/or second time interval information relating to the length of a first time interval (T1) and/or second time interval (T2) to the radio device, at the end of which the radio device assumes the sleep mode;
   wherein the control device is configured for the simultaneous or consecutive transmission of the blocking information and the first time interval and/or the second time interval information to the radio device;

wherein the motorcycle is adapted to trigger the control device as a result of an actuation of the switch unit on the handlebar for the wireless transmission of the blocking information and/or the first or second time interval information; and wherein the control device changeably sets the first time interval information and/or the second time interval information.

17. The system according to claim 16, wherein the control device is configured for the wireless receipt of a receipt acknowledgement information to the control device, transmitted by the radio device after receiving the blocking information or the first time interval information or the second time interval information.

18. The system according to claim 17, wherein the radio device is adapted to leave the sleep mode and to wirelessly transmit the authentication information as a result of an actuation of the radio device by a user of the radio device triggering the activation of the radio device.

19. The system according to claim 18, wherein the control device wirelessly transmits an operating mode information to the radio device, upon receipt of which the radio device remains in a communication mode maintaining communication with the control device.

20. A system having a motorcycle and a transportable radio device, wherein:
the motorcycle has:
a motorcycle frame having a steering head bearing seat;
a drive unit;
a switch unit; and
a control device adapted for:
wireless communication with the radio device and for controlling operating modes of the motorcycle depending on an authentication information transmitted from the radio device to the control device, and for
wireless transmission to the radio device of a blocking information shifting the radio device into a sleep mode, in which mode a communication of the radio device to the control device ceases; and
a handlebar block device provided with a remote-controllable, electrically actuated, lockable and unlockable bolt, the bolt releasably engageable with a recess of the steering head bearing seat or with a device, and wherein the control device monitors the engagement of the bolt; and wherein the control device is further adapted for wireless transmission of a first time interval information and/or second time interval information relating to the length of a first time interval (T1) and/or second time interval (T2) to the radio device, at the end of which the radio device assumes the sleep mode.

21. The system according to claim 20, wherein the operating modes comprise at least one state of the motorcycle selected from the group consisting of:
the drive unit of the motorcycle is shifted into preparation to drive or out of preparation to drive;
an immobilizer device of the motorcycle is activated or deactivated;
a lock of a fuel cap releasably sealing a fuel filling opening of a fuel tank of the motorcycle is activated or deactivated;
a lock of a seal of a luggage storage device of the motorcycle is activated or deactivated;
a lock of a seal of a seat arrangement of the motorcycle is activated or deactivated; and
a control device for activating the drive unit of the motorcycle is activated or deactivated.

22. The system according to claim 20, wherein the control device is configured for the simultaneous or consecutive transmission of the blocking information and the first time interval and/or the second time interval information to the radio device.

23. The system according to claim 20, wherein the control device changeably sets the first time interval information and/or the second time interval information.

24. The system according to claim 20, wherein the control device is configured for the wireless receipt of a receipt acknowledgement information to the control device, transmitted by the radio device after receiving the blocking information or the first time interval information or the second time interval information.

25. The system according to claim 20, wherein the radio device is adapted to leave the sleep mode and to wirelessly transmit the authentication information as a result of an actuation of the radio device by a user of the radio device triggering the activation of the radio device.

26. The system according to claim 20, wherein the control device wirelessly transmits an operating mode information to the radio device, upon receipt of which the radio device remains in a communication mode maintaining communication with the control device.

* * * * *